(12) United States Patent
Bank (10) Patent No.: US 9,444,864 B2
(45) Date of Patent: *Sep. 13, 2016

(54) PLAYLIST COMPILATION SYSTEM AND METHOD

(71) Applicant: Intel Corporation, Santa Clara, CA (US)

(72) Inventor: Bryna L. Bank, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,938

(22) Filed: Nov. 7, 2014

(65) Prior Publication Data

US 2015/0195319 A1    Jul. 9, 2015

Related U.S. Application Data

(63) Continuation of application No. 13/970,022, filed on Aug. 19, 2013, now Pat. No. 8,909,741, which is a continuation of application No. 11/112,441, filed on Apr. 22, 2005, now Pat. No. 8,516,093.

(51) Int. Cl.
*G06F 15/173* (2006.01)
*H04L 29/06* (2006.01)
*G06F 17/30* (2006.01)
*H04L 29/08* (2006.01)

(52) U.S. Cl.
CPC .......... *H04L 65/60* (2013.01); *G06F 17/30038* (2013.01); *G06F 17/30053* (2013.01); *H04L 67/02* (2013.01); *H04L 67/06* (2013.01)

(58) Field of Classification Search
CPC .............................. H04L 67/02; H04L 67/06
USPC ................................................... 709/219, 220
See application file for complete search history.

(56) References Cited

U.S. PATENT DOCUMENTS

| 6,987,221 | B2 | 1/2006 | Platt |
| 7,043,477 | B2 | 5/2006 | Mercer et al. |
| 7,089,309 | B2 | 8/2006 | Ramaley et al. |
| 7,840,691 | B1 | 11/2010 | Debonet et al. |
| 2004/0078383 | A1 | 4/2004 | Mercer et al. |
| 2005/0138186 | A1 | 6/2005 | Hesselink et al. |

*Primary Examiner* — Adnan Mirza
(74) *Attorney, Agent, or Firm* — Stoel Rives LLP (57) ABSTRACT

A method, computer program product and client electronic device for storing, in a memory of a client electronic device, a location of at least one remote media data file available to stream from a server device. A location of at least one local media data file available on the client electronic device is stored in the memory of the client electronic device. A playlist is compiled that defines the location of the at least one remote media data file and the location of the at least one local media data file. The at least one local media data file and the at least one remote media data file in the playlist are rendered and metadata concerning the at least one local media data file rendered is transmitted to the server device.

20 Claims, 9 Drawing Sheets

PLAYLIST COMPILATION SYSTEM AND METHOD

TECHNICAL FIELD

This disclosure relates to playlists and, more particularly, to playlists that include entries concerning both remote media data files and local media data files.

BACKGROUND

Media distribution systems (e.g., the Rhapsody™ service offered by RealNetworks™ of Seattle, Wash.) distribute media data files to a user's electronic device from a media server. A media distribution system may distribute media data files by allowing a user to receive downloaded media data files and/or stream remote media data files.

Streaming is a technique of transferring data files such that the data file is processed as a steady and continuous stream of information as it is being received. When streaming data files, a client-side browser on a user's electronic device can start processing the data file before the entire data file is transmitted. The streamed media data file may be in the form of audio, text, pictures, and/or video, examples of which include but are not limited to the streaming of music, radio broadcasts, movies, television/cable broadcasts, and sporting events, for example.

Often, when a user streams media data files (examples of which include but are not limited to songs, videos, etc.) from a media server, the media distribution system keeps track of the media data files streamed (or to be streamed) to the user's electronic device in the form of a history file. Users may save this history file (or portions thereof) as a playlist. A playlist may be a group of tracks (examples of which include, but are not limited to, songs, videos, etc) that the media distribution system or media player will render in sequence, thus allowing the user to compile custom music compilations.

DETAILED DESCRIPTION OF THE PREFERRED EMBODIMENTS

Figure 1:
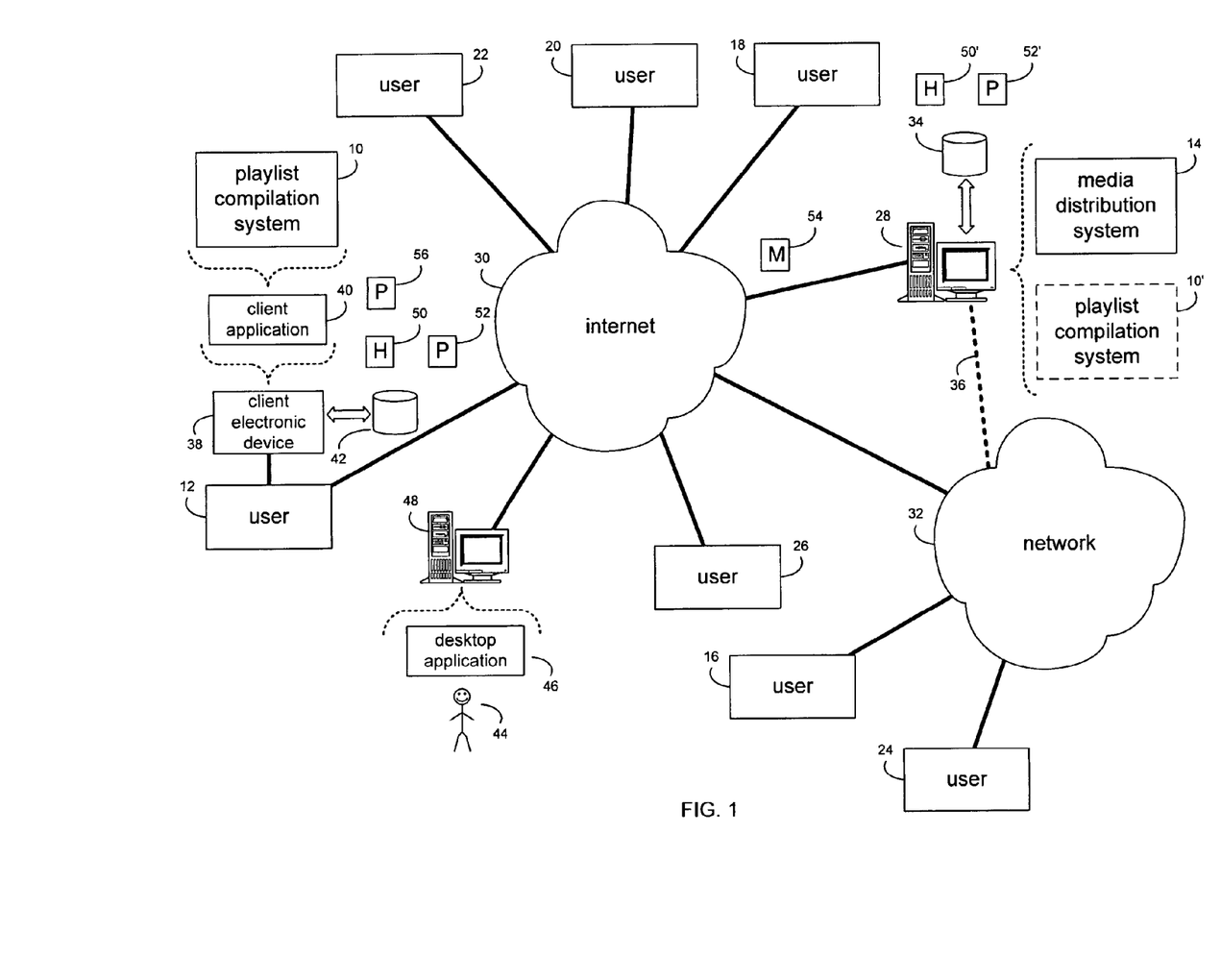
FIG. 1 is a diagrammatic view of a playlist compilation system and a media distribution system coupled to a distributed computing network.

Referring to FIG. 1, there is shown a playlist compilation system 10 that allows a user (e.g., user 12) to compile one or more hybrid playlists that define the location of both remote media data files (examples of which include but are not limited to data streams that are streamed by media distribution system 14) and local media data files (examples of which include but are not limited to data files that are provided by media distribution system 14 or another source). Examples of a remote media stream include: an audio media stream; a video media stream; and an audio/video media stream. Examples of a local media data file include: an audio media data file; a video media data file; and an audio/video media data file.

Media distribution system 14 typically provides media streams and/or media data files to a plurality of users (e.g., users 12, 16, 18, 20, 22, 24, 26). An example of such a media distribution system 14 is the Rhapsody™ service offered by RealNetworks™ of Seattle, Wash.

Media distribution system 14 is typically a server application that resides on and is executed by computer 28 (i.e., a server device) that is connected to network 30 (e.g., the Internet). Computer 28 may be a web server running a network operating system, examples of which include but are not limited to Microsoft Windows 2000 Server™, Novell Netware™, or Redhat Linux™.

Typically, computer 28 also executes a web server application, examples of which include but are not limited to Microsoft I IS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 14, which are typically stored on a storage device 34 coupled to computer 28, are executed by one or more processors (not shown) and one or more memory architectures (not shown) incorporated into computer 28. Storage device 34 may, by way of example, include but are not limited to a hard disk drive, a tape drive, an optical drive, a RAID array, a random access memory (RAM), or a read-only memory (ROM).

Users 12, 16, 18, 20, 22, 24, 26 may access media distribution system 14 directly through network 30 or through secondary network 32. Further, computer 28 (i.e., the computer that executes media distribution system 14) may be connected to network 30 through secondary network 32, as illustrated with phantom link line 36.

Users 12, 16, 18, 20, 22, 24, 26 typically access media distribution system 14 through a client electronic device 38 (examples of which include but are not limited to a client computer, a personal digital assistant, a cellular telephone, a television, a cable box, an internet radio, or a dedicated network device, for example) that is connected to network 30 (or network 32) and executes a client application 40 (examples of which include but are not limited to Microsoft Internet Explorer™, Netscape Navigator™, RealRhapsody™, RealPlayer™, or a specialized interface). Client electronic device 40 may run an operating system, examples of which include but are not limited to Microsoft Windows™, or Redhat Linux™. Additionally, client electronic device 38 may include one or more local data drives (not shown), examples of which include, but are not limited to, a CDROM drive and a DVD drive.

Playlist compilation system 10 is typically a component of client application 40 (examples of which include but are not limited to an embedded feature of client application 40, a software plug-in for client application 40, or a stand-alone application called from within and controlled by client application 40). The instruction sets and subroutines of client application 40 and playlist compilation system 10, which are typically stored on a storage device 42 coupled to client electronic device 38, are executed by one or more processors (not shown) and one or more memory architectures (not shown) incorporated into client electronic device 38. Storage device 42 may be, for example, a hard disk drive, a tape drive, an optical drive, a RAID array, a random access memory (RAM), or a read-only memory (ROM).

An administrator 44 typically accesses and administers media distribution system 14 through a desktop application 46 (examples of which include but are not limited to Microsoft Internet Explorer™, Netscape Navigator™, or a specialized interface) running on an administrative computer 48 that is also connected to network 30 (or network 32).

Media distribution system 14 distributes media to users 12, 16, 18, 20, 22, 24, 26, such that the media distributed may be in the form of remote media data streams and/or local media data files. Examples of the types of media distributed by media distribution system 14 include: audio files (examples of which include but are not limited to music files, audio news broadcasts, and audio sports broadcasts, for example); video files (examples of which include but are not limited to video footage that does not include sound, for example); audio/video files (examples of which include but are not limited to a/v news broadcasts, a/v sports broadcasts, movies and movie clips, and music videos, for example); and multimedia content (examples of which include but are not limited to interactive presentations and slideshows, for example).

For example, if media distribution system 14 is a music distribution system, user 12 may be allowed to download music files (examples of which include but are not limited to MP3 files or AAC files), such that copies of the music files are transferred from computer 28 to client electronic device 38. Alternatively, media distribution system 14 may only allow user 12 to receive a media data stream of a data file. As discussed above, when a file is streamed from e.g., computer 28 to client electronic device 38, a copy of the file is not retained on client electronic device 38. Further, media distribution system 14 may allow user 12 to stream media data files and download media data files. An example of such a media distribution system may include but is not limited to the Rhapsody™ service offered by RealNetworks™ of Seattle, Wash.

As discussed above, when a user (examples of which include but are not limited to user 12) streams media (examples of which include but are not limited to songs, videos, etc) from computer 28, media distribution system 14 monitors the media streamed by the user in the form of a media history file 50. Users may save this history file 50 (or portions thereof) as a playlist, such that a playlist is a list of tracks (examples of which include but are not limited to songs, videos, etc) that media distribution system 14 will play in sequence, thus allowing user 12 to assemble custom music compilations (in the form of multiple playlists).

Accordingly, when user 12 uses client application 40 to play media streams served by media distribution system 14, a media history file 50 is maintained (by client application 40), which defines the media that had been streamed to user 12. While media history file 50 is typically maintained locally (e.g., maintained on client electronic device 38), media history file 50 may alternatively/additionally be maintained remotely (e.g., maintained on computer 28) as a remote media history file 50'.

Figure 2:
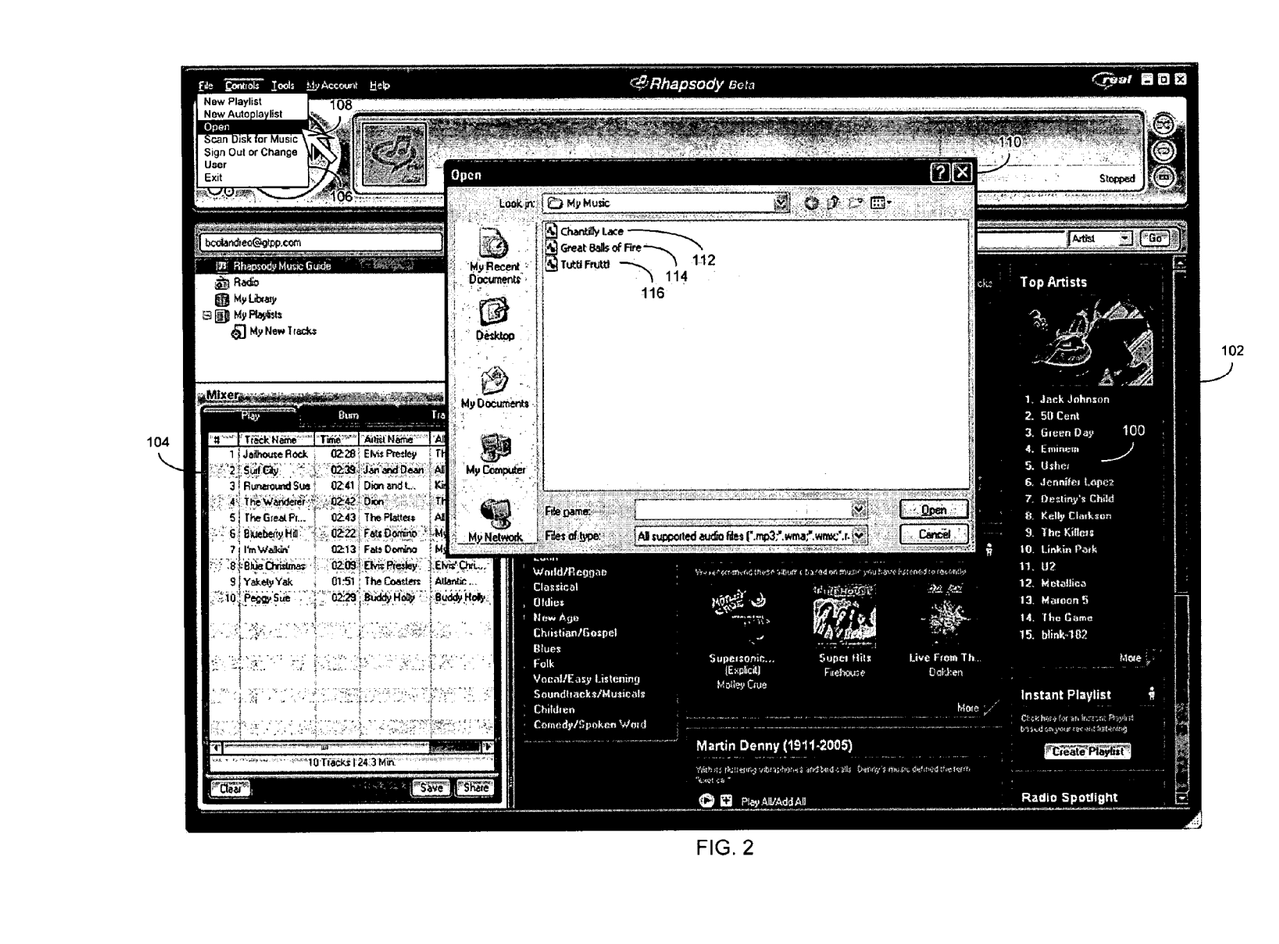
FIG. 2 is a display screen rendered by the playlist compilation system of FIG. 1.

Referring also to FIG. 2, upon accessing media distribution system 14, user 12 may be presented with a welcome display screen 100. Client application 40 typically includes a user interface 102 (e.g., a web browser) for interfacing with media distribution system 14 and viewing welcome display screen 100. A history window 104 may be included that itemizes the information contained within media history file 50. In this example, history window 104 itemizes ten (10) remote media streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 12 had previously listened to those ten (10) remote media streams.

In addition to remote media streams (i.e., media streams received from a remote device e.g., computer 28), client application 40 allows user 12 to play local media data files. As discussed above, a local media data file may be a purchased media data file (i.e., a file that was purchased by user 12), a tethered media data file (i.e., a file subscribed to by user 12), or a media data file extracted (i.e., ripped) from e.g., a music compact disc, for example. These local media data files are stored locally e.g., on storage device 42 coupled to client electronic device 38. As discussed above, examples of client electronic device 38 may be, but are not limited to, a client computer, a personal digital assistant, a cellular telephone, a television, a cable box, an internet radio, or a dedicated network device.

If user 12 wishes to play a local media data file (i.e., a file stored on client electronic device 38), user 12 may e.g., select the file(s) to be played using client application 40. Accordingly, user 12 may select the dropdown "File" menu 106 using screen pointer 108, which is controllable by a pointing device (e.g., a computer mouse, not shown). Selecting the "Open" command may result in client application 40 rendering file management window 110, which allows user 12 to select local media data files for playback.

In this example, file management window 110 defines three (3) local media data files, namely: "Chantilly Lace" 112; "Great Balls of Fire" 114; and "Tutti Frutti" 116, all of which are stored within the folder "My Music". User 12 may select any (or all) of these files for playback on client application 40.

Figure 3:
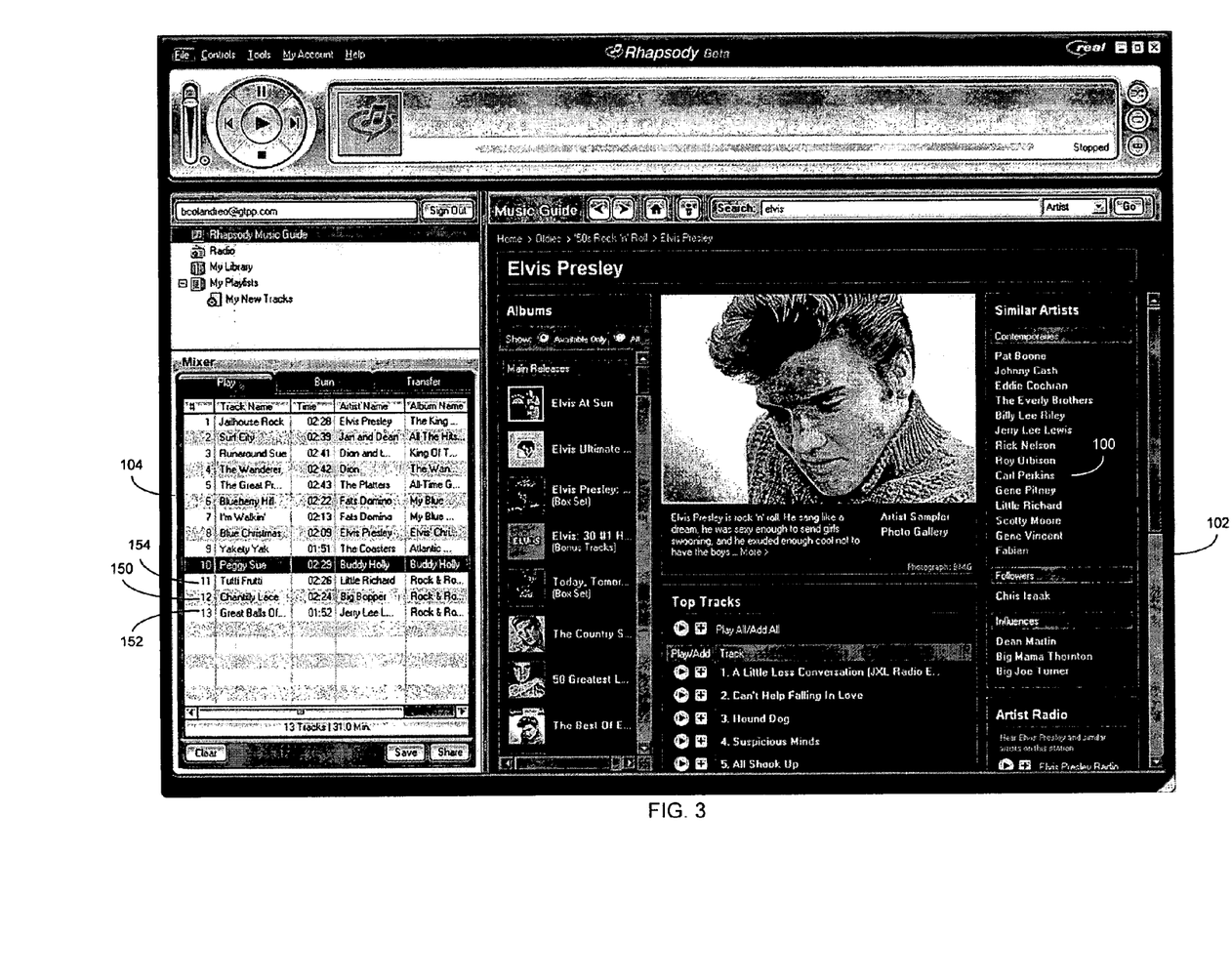
FIG. 3 is a display screen rendered by the playlist compilation system of FIG. 1.

Referring also to FIG. 3 and assuming that user 12 selects all three local media data files for playback, media history file 50 is amended to include three additional entries, namely one for "Chantilly Lace"; one for "Great Balls of Fire"; and one for "Tutti Frutti". Accordingly, as history window 104 itemizes the information contained within media history file 50, history window 104 will include three additional entries (i.e., entries 150, 152, 154), which correspond to local media data file "Chantilly Lace" 112; local media data file "Great Balls of Fire" 114; and local media data file "Tutti Frutti" 116.

Assuming that user 12 wishes to save this collection of music for future playback, user 12 may save the current media history file 50 (or a portion thereof) as a playlist 52 (FIG. 1). While playlist 52 is typically maintained locally (e.g., maintained on client electronic device 38), playlist 52 may alternatively/additionally be maintained remotely (e.g., maintained on computer 28) as a remote playlist 52'.

Figure 4:
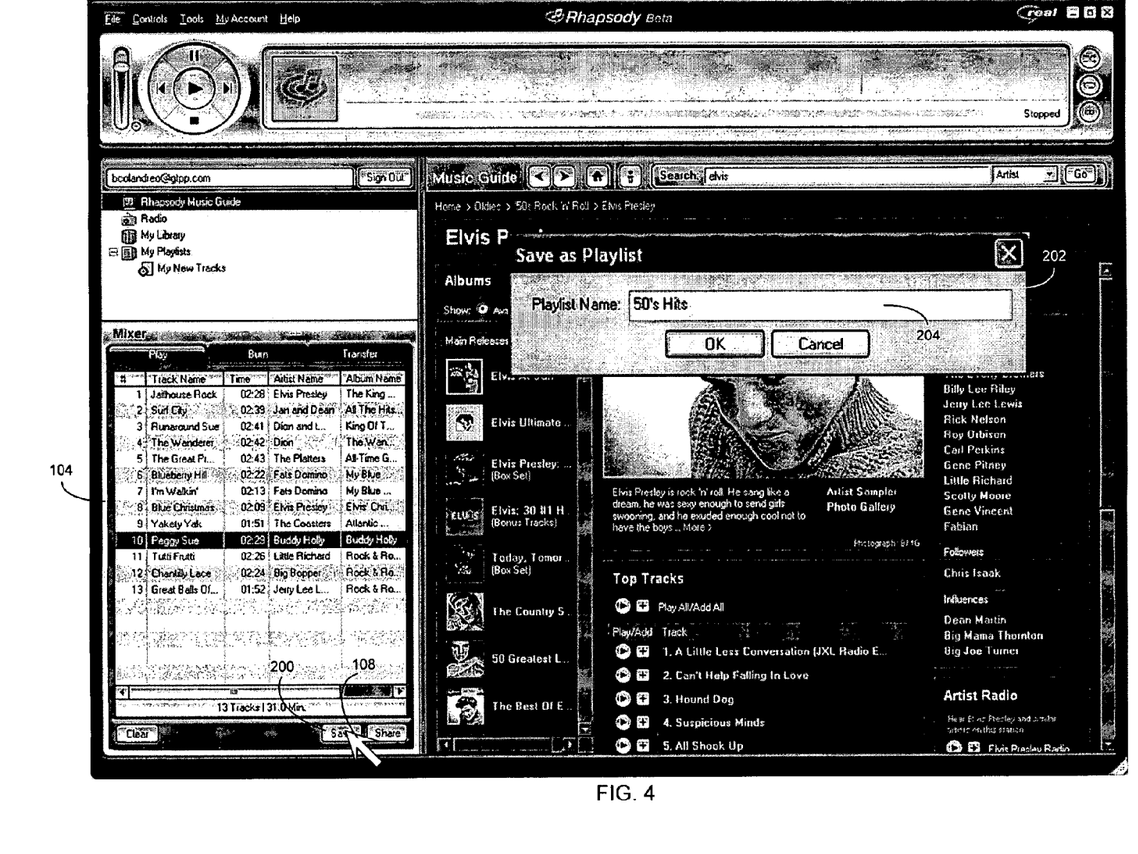
FIG. 4 is a display screen rendered by the playlist compilation system of FIG. 1.

Referring also to FIG. 4, user 12 may select the "save" button 200 (using screen pointer 108). Once the "save" button 200 is selected, a playlist naming window 202 is rendered (by playlist compilation system 10) that allows user 12 to specify a unique name for playlist 52 within the name field 204 of playlist naming window 202.

Assuming that user 12 selects "50's Hits" as a playlist name, playlist 52 is saved (i.e., as "50's Hits") and defines the location of all of the songs itemized within history window 104.

Figure 5:
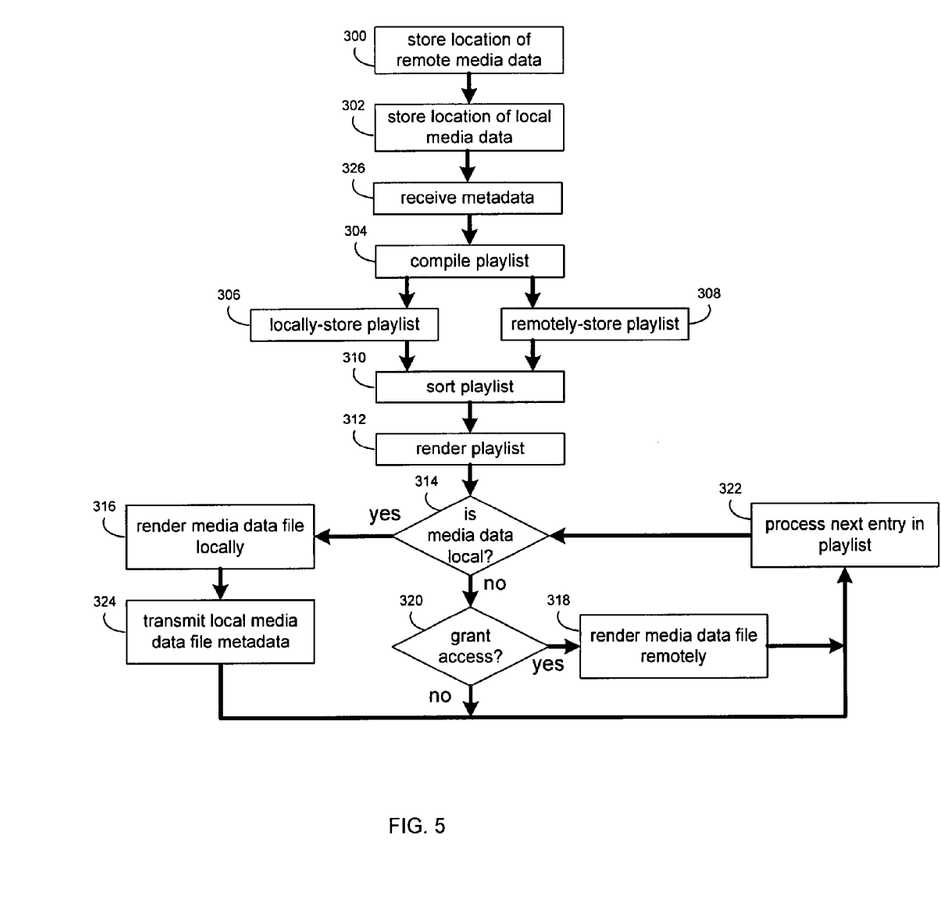
FIG. 5 is a flow chart of a process executed by the playlist compilation system of FIG. 1.

Referring also to FIG. 5, when user 12 chooses to save a playlist (i.e., in this example, playlist 52 named "50's Hits" that defines the location of ten (10) remote media streams and three (3) local media data files), playlist compilation system 10 stores 300 a location for each remote media stream included within playlist 52. This location information may be stored on the one or more memory architectures (not shown) incorporated into client electronic device 38 or on storage device 42 coupled to client electronic device 38, for example. An example of such a stream location may include a uniform resource locator (e.g., www.musicshop.com\songsjailhouse_rock.ram); a file transfer protocol address (e.g., ftp:// musicshop.com\songs\jailhouse_rock.ram; and/or and an internet protocol address (e.g., 192.168.1.163\songsjailhouserock.ram). Additionally, playlist compilation system 10 stores 302 a location for each local media data file included within playlist 52. This location information may be stored on the one or more memory architectures (not shown) incorporated into client electronic device 38 or on storage device 42 coupled to client electronic device 38, for example. An example of such a file location may include a drive; a path; and/or a filename (e.g., c:\my music\chantilly_lace.mp3). Once the locations of each remote media stream and each local media data file are defined, playlist compilation system 10 compiles 304 playlist 52, which is typically locally-stored 306 (e.g., playlist 52 on storage device 42 coupled to client electronic device 38). However, the playlist may be remotely-stored 308 (e.g., playlist 52' on storage device 34 coupled to computer 28).

Figure 6:
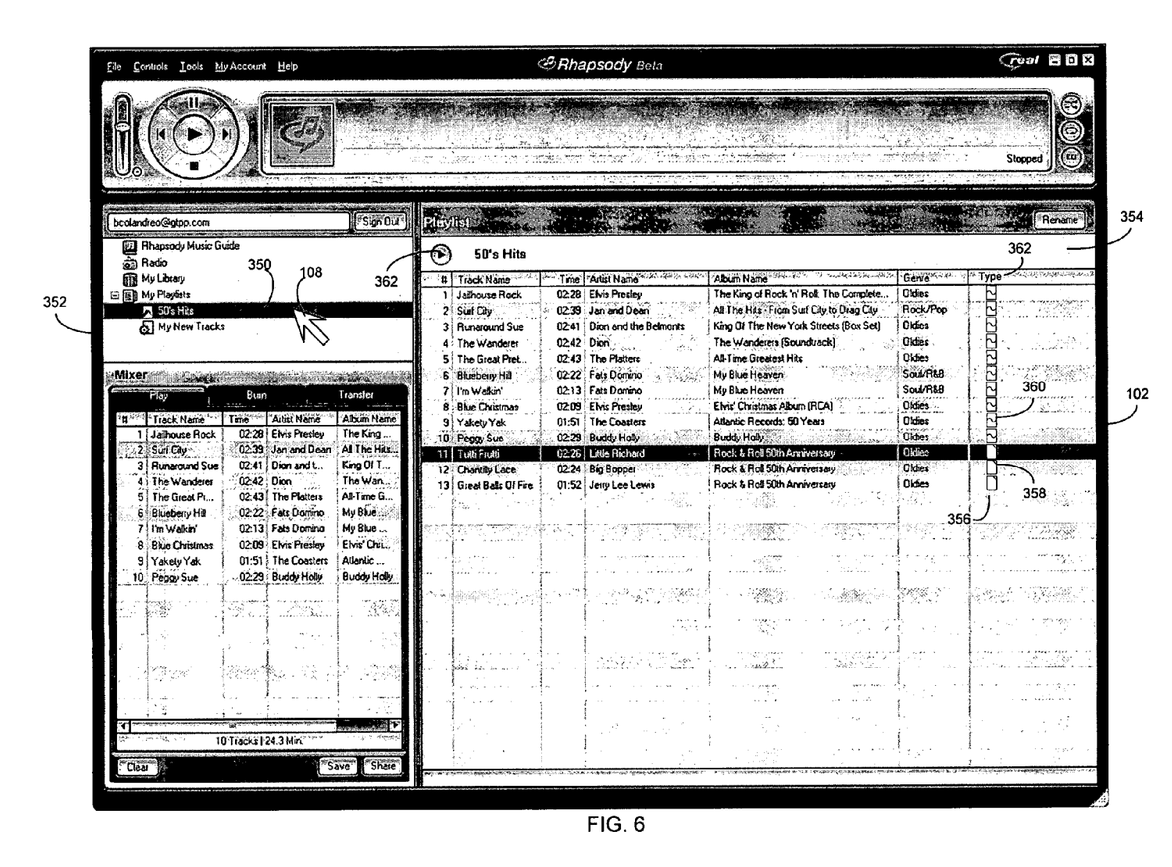
FIG. 6 is a display screen rendered by the playlist compilation system of FIG. 1.

Referring also to FIG. 6, once playlist 52 is compiled 304 and stored 306 (or 308), a link 350 to playlist 52 (e.g., "50's Hits") appears in directory window 352. User 12 may then select link 350 using screen pointer 108.

Once selected, the songs included within playlist 52 (e.g., "50's Hits") are itemized within a playlist window 354 (e.g., a web page) viewable via user interface 102. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of remote media streams and three of these entries (namely "Tutti Frutti"; "Chantilly Lace"; and "Great Balls of Fire") define the location of local media data files.

Typically, playlist window 354 includes hyperlinks that locate (i.e., provide addresses for) the streams/files associated with the individual entries itemized within playlist 52. This location information is stored within playlist 52. For example, the following table correlates the track name of an entry in playlist 52 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |

-continued

| Track Name | Address |
| --- | --- |
| Blue Christmas | www.musicshop.com\songs\blue_christmas.ram |
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify remote media streams, the address provided for each entry points to a media stream available from e.g., media distribution system 14. Further, as the last three entries (namely "Tutti Frutti"; "Chantilly Lace"; and "Great Balls of Fire") identify local media data files, the address provided for each entry points to a media data file available from e.g., client electronic device 38.

Playlist window 354 is typically tabular and may include a column 356 identifying a media type (i.e., remote media stream or local media data file, for example) for each entry within the playlist window 354. Typically, column 356 includes icons that identify the media type (e.g., icon 358 identifies a local media data file and icon 360 identifies a remote media stream).

Typically, user 12 may sort 310 (FIG. 5) the playlist based upon media type. For example, if the local media data files and the remote media streams were intermingled within the playlist, user 12 may click on the "type" column heading 362 (via screen pointer 108) to sort the line items within the playlist based upon media type (resulting in the line items being ordered in the manner shown in playlist window 354). Additionally, if user 12 clicked on "type" column heading 362 a second time, the local media data file entries (i.e., entries 11-13) may be moved to the top of the list, resulting in the remote media stream entries (i.e., entries 1-10) being moved to the bottom of the list.

Once playlist 52 is sorted in a manner that is agreeable with user 12, user 12 may select the "play" button 362 to render 312 (FIG. 5) playlist 52 in its current form (i.e., the manner in which it is currently sorted).

When processing playlist 52, client application 40 may processes each entry in playlist 52 to determine the location of the stream/file associated with that entry, so that the associated remote media stream/local media data file can be played. For example, concerning the first entry (i.e., Jailhouse Rock), being this is an entry that points toward a remote media stream (as opposed to a local media data file), client application 40 may first determine 314 if the media data file is available locally. If this media data file (i.e., Jailhouse Rock) is available locally (e.g., within c:\mymusic\), client application 40 may locally obtain and render 316 the media data file, resulting in the playing of "Jailhouse Rock". However, for this particular entry, the media data file is not available locally. Therefore, client application 40 may remotely obtain and render 318 the media data file from "www.musicshop.com\songs\jailhouse_rocksam" (as specified above). This media data stream would typically be served by media distribution system 14 via computer 28.

As media distribution system 14 is typically subscription-based, user 12 may be required to be a member of media distribution system 14 prior to being able to receive the "Jailhouse Rock" media data stream from computer 28. Accordingly, prior to granting user 12 access to the "Jailhouse Rock" media data stream, client application 40 may verify that user 12 is a current subscriber to media distribution system 14. Therefore, if user 12 is a current subscriber, client application 40 will grant 320 user 12 access to the "Jailhouse Rock" media data stream. However, if client application 40 determines that user 12 is not a current subscriber, user 12 may be e.g., denied access to the "Jailhouse Rock" media data stream, or given conditional/reduced access (examples of which include but are not limited to the user being allowed to use the service for a limited trial period, limited track duration or at a lower sound quality).

When the "Jailhouse Rock" media data stream is completed, client application 40 would process 322 the next entry and obtain the media data stream for "Surf City" from "www.musicshop.com\songs\surf city.ram" (as specified above). This media data stream would typically be served by media distribution system 14 via computer 28. This process would continue until all of the remote media data streams and local media data files specified within playlist 52 were played (or the playback process was altered or cancelled), regardless of whether the entry refers to a remote media data stream or a local media data file. For example, when the "Peggy Sue" media data stream is completed, client application 40 would process the entry for "Tutti Frutti" and play the appropriate local media data file (i.e., c:\my music\tutti_frutti.mp3), which is located on client electronic device 38.

As discussed above, media distribution system 14 typically provides media data streams and/or media data files to a plurality of users (e.g., users 12, 16, 18, 20, 22, 24, 26). Typically, metadata is associated with each remote media data stream provided by media distribution system 14. This metadata may include (but is not limited to) an artist identifier, an album identifier, a track identifier, an album cover image, and a music genre identifier, for example.

Accordingly, whenever e.g., user 12 plays a remote media data stream, media distribution system 14 may compile and save this metadata (on a per-user basis) to track e.g., listening trends and musical preferences of individual users, for example.

As discussed above, a local media data file (as opposed to a remote media data stream) may be a purchased media data file (e.g., a file that was purchased by user 12), a tethered media data file (e.g., a file subscribed to by user 12), or a media data file extracted (i.e., ripped) from e.g., a music compact disc, for example.

If the purchased media data files and/or the tethered media data files were provided by media distribution system 14, these local media data files would typically also include the metadata described above. Accordingly, when these purchased or tethered media data files are played by user 12, the metadata concerning these purchased/tethered media data files may be transmitted 324 (FIG. 5) to computer 28, such that the metadata is compiled and saved (on a per user basis) to track e.g., listening trends and musical preferences, for example.

However, for local media data files that were e.g., extracted from music compact discs, these data files may not include the above-described metadata. As discussed above, local media data files (i.e., files stored on client electronic device 38) may to be played using client application 40 and added to playlists. Accordingly, whenever user 12 attempts to add a local media data file (that does not include metadata) to a playlist (e.g., playlist 52), user 12 may be prompted to provide metadata concerning that local media data file.

Figure 7:
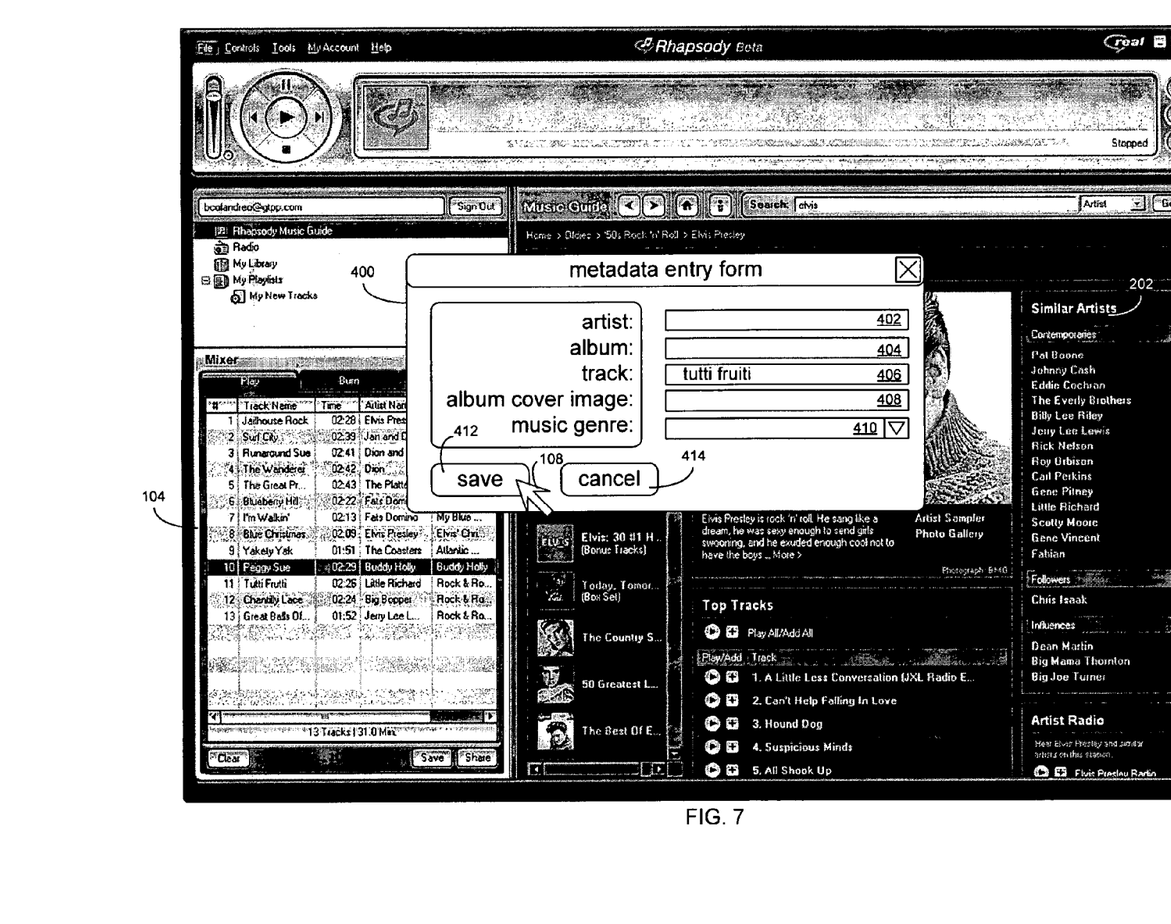
FIG. 7 is a display screen rendered by the playlist compilation system of FIG. 1.

Referring also to FIG. 7 and continuing with the above stated example, if user 12 attempts to save a playlist (e.g., playlist 52) that includes three local media data files (namely "Tutti Frutti"; "Chantilly Lace"; and "Great Balls of Fire"), assuming that these three local media data files do not include metadata, playlist compilation system 10 may render a metadata entry form 400 that allows user 12 to enter metadata concerning each of the three local media data files.

In this example, metadata entry form 400 includes five user-editable fields, namely an artist field 402, an album field 404, a track field 406, an album cover image field 408, and a music genre field 410. Album cover image field 408 may allow user 12 to define a drive, a path, and a filename for an album cover image. Music genre field 410 may be a drop-down menu (operable via screen pointer 108) that allows user 12 to select a music genre from a number of predefined music genres (not shown).

Typically, if the title of the local media data file is descriptive of the track name, the track field 406 may be populated with what playlist compilation system 10 suspects is the song title. As the first local media data file is named "tutti frutti", track field 406 would typically be populated with the suspected name "tutti frutti". User 12 may populate the remaining fields and select the save button 412 (using screen pointer 108) or alternatively select the cancel button 414.

In order to further automate the metadata generation process, client application 40 may interface with a remote metadata database (not shown) served by e.g., media distribution system 14 or a third party (not shown). This metadata database may define metadata for various tracks and albums. An example of such a database is the CDDB™ database maintained by Gracenote™ of Emeryville, Calif. (www.gracenote.com). For example, if user 12 ripped each track from an entire compact disc, the metadata database may be accessed by playlist compilation system 10 and a query may be structured that defines e.g., the total number of tracks included on the compact disc, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 12 may be prompted to select the appropriate compact disc from a list of possible matches (not shown).

Accordingly, playlist compilation system 10 defines metadata for local media data files that were e.g., extracted from music compact discs. Therefore, when these local media data files are played (by client application 40), the metadata concerning these media data files may be transmitted 324 (FIG. 5) to computer 28, such that this metadata is compiled and saved (on a per-user basis) to track e.g., listening trends and musical preferences.

The metadata described above may be incorporated into playlist 52. As described above, this metadata may include (but is not limited to) an artist identifier, an album identifier, a track identifier, an album cover image, and a music genre identifier, for example. Additionally, the metadata may include a location identifier that defines the location of the media data file. For example, the metadata for "Tutti Frutti" may include: "Little Richard" (i.e., the artist identifier); "Specialty Records Greatest Hits" (i.e., the album identifier); "Tutti Frutti" (i.e., the track identifier); "home, oldies, 50's rock 'n' roll" (i.e., the music genre identifier); and "c:\my music\tutti_frutti.mp3" (i.e., the location identifier).

Computer 28 and media distribution system 14 may use the above-described metadata (transmitted 324 by client electronic device 38 to computer 28) to generate suggested playlists (not shown) that are based upon the listening habits and preferences of the user (or a group of users). For example and as discussed above, the music genre for "Tutti Frutti" is "home, oldies, 50's rock 'n' roll". Accordingly, a person that likes "Tutti Frutti" is likely to enjoy other 50" artists, such as "Elvis Presley", "Jan and Dean", "Dion", "The Platters", "Fats Domino", "The Coasters" and "Buddy Holly", for example.

Accordingly, media distribution system 14 may generate suggested metadata 54 that defines one or more tracks, artists, and albums that a user (e.g., user 12) is likely to enjoy due to the user's listening history (or the listening history of a group of users). Client electronic device 38 may receive 326 suggested metadata 54 from computer 28 and compile 304 a suggested playlist 56 for the user. This suggested playlist 56 may then be saved by the user on e.g., client electronic device 38 and/or computer 28.

Playlists may be modified and entries may be added to (or removed from) a playlist. Unfortunately, as a playlist grows large, it is foreseeable that a user (e.g., user 12) may inadvertently add the same track to a playlist multiple times.

Figure 8:
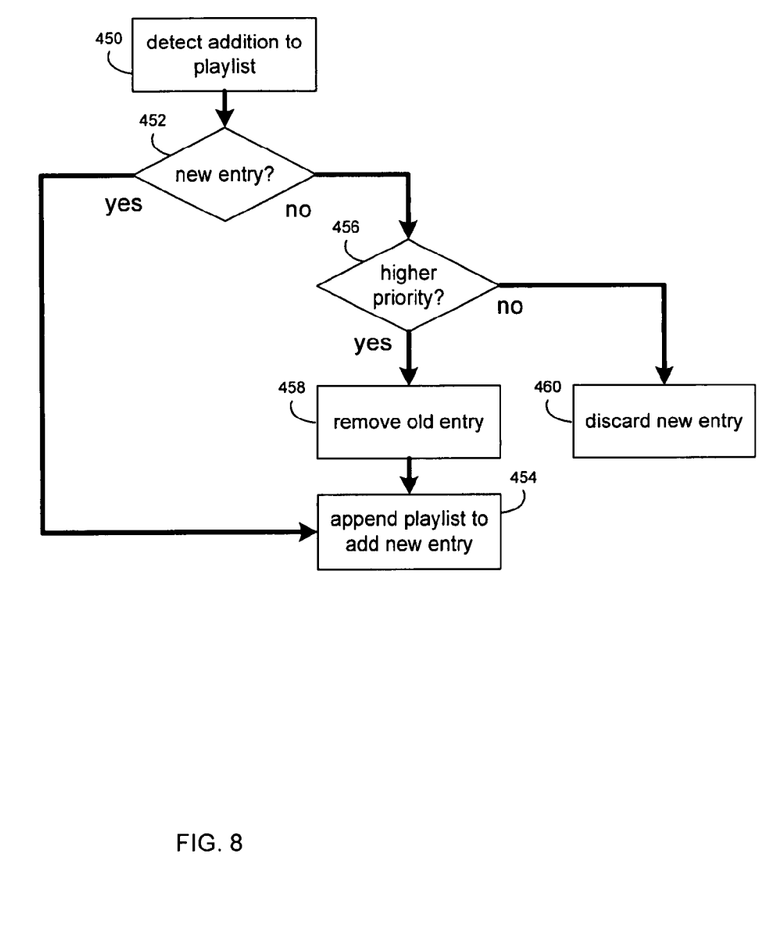
FIG. 8 is a flow chart of a process executed by the playlist compilation system of FIG. 1.

Referring also to FIG. 8, playlist compilation system 10 monitors any additions and deletions being made to a playlist (e.g., playlist 52). Accordingly, when playlist compilation system 10 detects 450 that a playlist is being appended to define the location of a new media data file, a determination 452 is made concerning whether the playlist already includes an entry that locates a media data file that corresponds to the new media data file. For example, if user 12 wished to add "tutti frutti" to playlist 52, playlist compilation system 10 would examine playlist 52 and determine 452 that playlist 52 already included an entry for "tutti frutti".

Typically, playlist compilation system 10 makes determination 452 by comparing the metadata (e.g., artist identifiers, album identifiers, and track identifiers, for example) of the media data file associated with each current entry in playlist 52 to the metadata of the new media data file to be added to playlist 52. Therefore, playlist compilation system 10 would typically allow user 12 to add multiple renditions of a single song (as performed by a single artist on multiple albums, or by multiple artists), as the metadata for each of these media data files would differ.

If playlist compilation system 10 determines 452 that playlist 52 does not include an entry (i.e., does not include metadata) that locates a media data file that corresponds to the new media data file to be added to playlist 52, playlist compilation system 10 appends 454 playlist 52 to include an entry that defines the location of the new media data file. When appending 454 playlist 52, playlist compilation system 10 may append playlist 52 to include metadata that locates the new media data file.

If playlist compilation system 10 determines 452 that playlist 52 includes an entry (i.e., includes metadata) that locates a media data file that corresponds to the new media data file to be added to playlist 52, playlist compilation system 10 determines 456 which of the two media data files (i.e., the existing media data file currently located by playlist 52 or the new media data file to be located by playlist 52) has a higher priority.

As discussed above, media data files may be purchased media data files (e.g., a media data file that was purchased by user 12 and is currently owned by user 12); tethered media data files (e.g., a file that is useable by user 12 provided that e.g., user 12 continues to pay a monthly subscription fee), or remote media data files (e.g., remote media data streams that are not owned by user 12). Typically, the priority of a media data file is based upon its file type. For example, a purchased media data file has the highest priority; a tethered media data file has a medium priority; and a remote media data file has the lowest priority.

Accordingly, when determining priority 456, the file type of each file (i.e., the existing media data file currently located by playlist 52 and the new media data file to be located by playlist 52) is examined. If the priority of the new media data file to be added to playlist 52 exceeds the priority of the corresponding media data file currently located by playlist 52, playlist 52 is modified by playlist compilation system 10 to: remove 458 the entry that locates the corresponding media data file; and add 454 an entry that defines the location of the new media data file. When appending 454 playlist 52, playlist compilation system 10 may append playlist 52 to include metadata that locates the new media data file. Additionally, when removing 458 the entry that locates the corresponding media data file, playlist compilation system 10 may remove the metadata related to the corresponding media file.

Alternatively, if the priority of the new media data file to be added to playlist 52 does not exceed the priority of the corresponding media data file currently located by playlist 52, playlist 52 is not modified by playlist compilation system 10 and the new entry is discarded 460.

While playlist compilation system 10 is described above as typically being a component of client application 40, such that the instruction sets and subroutines of client application 40 and playlist compilation system 10 are typically stored on a storage device 42 coupled to client electronic device 38, other configurations are possible.

For example, playlist compilation system 10' may be exclusively or partially executed by computer 28 (i.e., the computer that executes media distribution system 14). Accordingly and as discussed above, media history file 52' may be stored remotely (e.g., on computer 28). Further and as discussed above, this history file may define both remote media data streams and local media data files. Therefore, since a history file (or a portion thereof) may be saved as a playlist and playlist(s) may be stored remotely (e.g., on computer 28), playlist compilation system 10' may be a server application executed by computer 28. Alternatively, playlist compilation system 10' may be a component of media distribution system 14 (e.g., an embedded feature of media distribution system 14, a software plug-in for media distribution system 14, or a stand-alone application called from within and controlled by media distribution system 14, for example). Accordingly, the instruction sets and subroutines of playlist compilation system 10', which may be stored on storage device 34 coupled to computer 28, may be executed by one or more processors (not shown) and one or more memory architectures (not shown) incorporated into computer 28.

As a copy of the same playlist may be stored locally (e.g., on client electronic device 38) and remotely (e.g., on computer 28), playlist compilation system 10 automatically synchronizes the locally-stored playlist(s) with the remotely-stored playlist(s) at the time the user (e.g., user 12) logs in to media distribution system 14.

For example and as discussed above, user 12 saves a playlist entitled "50's Hits", which is either locally-stored 306 (e.g., on client electronic device 38) or remotely-stored 308 (e.g., on computer 28). Regardless of the location at which the playlist is stored, the playlist is typically automatically synchronized to the other storage location. For example, if playlist 52 is locally-stored 306, the playlist will subsequently be automatically synchronized onto computer 28. Alternatively, if playlist 52 is remotely-stored 308, the playlist will subsequently be automatically synchronized onto client electronic device 38. This initial synchronization function (between e.g., client electronic device 38 and computer 28) typically occurs at (or very close to) the time that the playlist (e.g., playlist 52) is initially either locally-stored 306 (e.g., on client electronic device 38) or remotely-stored 308 (e.g., on computer 28).

Accordingly, once user 12 creates playlist 52, by the time user 12 logs out of media distribution system 14, the newly-created playlist (e.g., playlist 52) typically has already been synchronized between the remote device (e.g., computer 28) and the local device (e.g., client electronic device 38).

Figure 9:
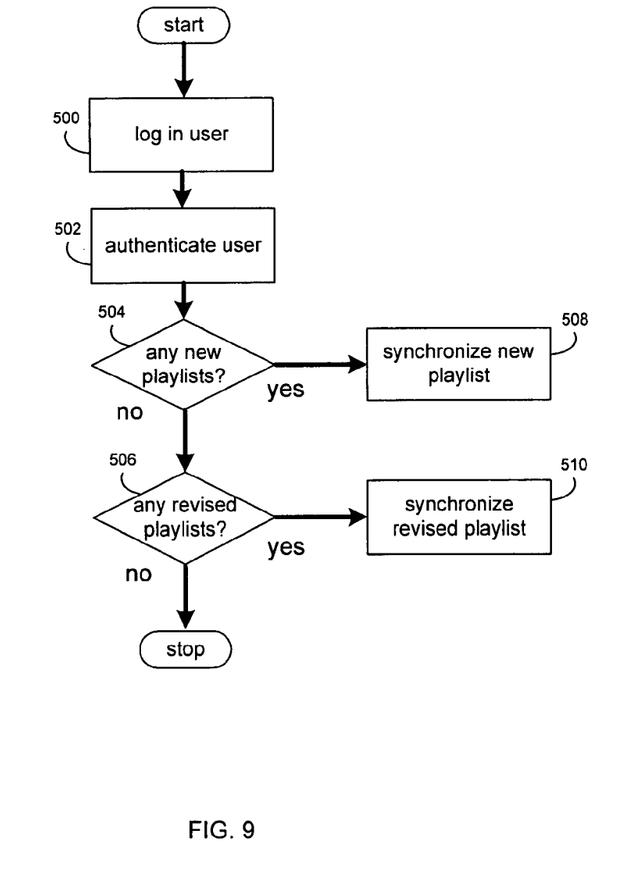
FIG. 9 is a flow chart of a process executed by the playlist compilation system of FIG. 1.

Referring also to FIG. 9, whenever user 12 logs in 500 to media distribution system 14, user 12 may be authenticated 502. User 12 may log into a server in media distribution system 14 that includes the playlist or a special authentication server (not shown). This authentication process may, for example, include the verification of a username/password, the verification of an active subscription (e.g. the subscription is current and/or been paid), the transmission of a cookie, and/or the use of encryption keys. Once the user is authenticated 502, the locally-stored playlists may be compared 504 to the remotely-stored playlists to determine if either device (e.g., the remote device or the local device) contains any new playlists that are not present on the other device. This playlist comparison process typically includes a version comparison process for comparing 506 the versions of common playlists (i.e., playlists that are present on both the remote device and the local device) to verify whether each device has the newest version of any common playlist.

Typically, this version comparison process may be made by e.g., comparing the time/date stamp of each playlist or the data within the playlist itself. Accordingly, the newest playlist would have the most-recent time/date stamp. Alternatively, each time a playlist is modified, a version number associated with that playlist may be incremented. Accordingly, the newest playlist would have the highest version number.

When comparing 504 the locally-stored playlists to the remotely-stored playlists, in the event that one device (e.g., the remote device) contains a playlist that is not present on the other device (e.g., the local device), the local device and the remote device are synchronized 508.

For example, assume that user 12 creates playlist 52 using a first client electronic device (e.g., client electronic device 38). As discussed above, prior to logging out of media distribution system 14, synchronization occurs and playlist 52 is typically present on both the local device (e.g., client electronic device 38) and the remote device (e.g., computer 28). If user 12 subsequently logs in 500 and is authenticated 502 using a second client electronic device (not shown), when comparing 504 the playlists on the remote device (e.g., computer 28) to the playlists on the local device (e.g., the second client electronic device, not shown), it will be determined that playlist 52 is not present on the second client electronic device. Accordingly, the two devices will be synchronized 508 and playlist 52, or missing entries therein, will be copied from the remote device (e.g., computer 28) to the local device (e.g., the second client electronic device, not shown). Further, assume that user 12 modifies playlist 52 by adding an additional song. As discussed above, prior to logging out of media distribution system 14, synchronization occurs and a copy of the modified playlist will be present on both the remote device (e.g., computer 28) and the local device (e.g., the second client electronic device, not shown).

When comparing 506 the versions of common playlists, in the event that one device (e.g., the remote device) contains a newer version of a common playlist than that stored on the other device (e.g., the local device), the local device and the remote device may be synchronized 510.

Continuing with the above-stated example, since user 12 modified playlist 52 using the second client electronic device (not shown), that modified version of playlist 52 may not be present on client electronic device 38. However, the original "unmodified" version of playlist 52 may be present on client electronic device 38. Accordingly, if user 12 subsequently logs in 500 and is authenticated 502 using client electronic device 38, when comparing 504 the playlists on the remote device to the playlists on the local device, it may be determined that playlist 52 is a common playlist, as it is present on both the local and remote devices. However, when comparing 506 the versions of the common playlists (e.g., playlist 52), the version on the remote device (e.g., computer 28) may be newer than the version on client electronic device 38, as user 12 used a second client electronic device (not shown) to modify playlist 52. Accordingly, the two devices may be synchronized 510 and the newer version of playlist 52 may be copied from the remote device (e.g., computer 28) to the local device (e.g., client electronic device 38).

A number of implementations have been described. Nevertheless, it will be understood that various modifications may be made. Accordingly, other implementations are within the scope of the following claims.

What is claimed is:

1. A system for distributing media to a client computing device, the system comprising:
 one or more processors;
 an electronic storage device accessible by the one or more processors, the electronic storage device storing electronic media for distribution to one or more client electronic devices;
 a network interface to receive media requests from and distribute media to the one or more client electronic devices over a network;
 a media distribution system to, by the one or more processors:
  retrieve first media from the electronic storage device according to a media request from a client electronic device of the one or more client electronic devices;
  serve the first media by transmitting the first media over the network via the network interface to the client electronic device;
  store metadata of the first media in a compilation of metadata to track one or more of listening trends and musical preferences of individual users, including a user of the client electronic device;
  receive from the client electronic device metadata of second media stored locally on the client electronic device and rendered by the client electronic device; and
  store the metadata of the second media in the compilation of metadata; and
 a playlist compilation system to use the compilation of metadata to generate a suggested playlist based on one or more of a listening trend and a musical preference derived from both the metadata of the first media and the metadata of the second media.

2. The system of claim 1, wherein the generated playlist comprises:
   a location of electronic media remote from the client electronic device and available to stream to the client electronic device from the system; and
   a location of electronic media locally stored on the client electronic device.

3. The system of claim 1, the playlist compilation system further to transmit the suggested playlist to the client electronic device for storage of a client version of the suggested playlist on the client electronic device.

4. The system of claim 3, the playlist compilation system further to:
   store a server version of the suggested playlist on the system; and
   synchronize the client version of the suggested playlist stored on the client electronic device with the server version of the suggested playlist stored on the system, upon the client electronic device login to the system.

5. The system of claim 4, wherein synchronizing the client version of the suggested playlist with the server version of the suggested playlist includes copying to the server version of the suggested playlist entries of the client version of the suggested playlist that are missing from the server version of the suggested playlist.

6. The system of claim 1, the media distribution system further to, by the one or more processors:
   retrieve a plurality of media from the electronic storage device according to a plurality of media requests from a plurality of client electronic devices;
   serve the plurality of media by transmission over the network via the network interface to the plurality of client electronic devices;
   store metadata of the plurality of media in a compilation of metadata to track one or more of listening trends and musical preferences of a group of users of the plurality of client electronic devices;
   receive from the plurality of client electronic devices metadata of a plurality of additional media each stored locally on and rendered by at least one of the plurality of client electronic devices; and
   store the metadata of the plurality of additional media in the compilation of metadata; and
a playlist compilation system to use the compilation of metadata to generate a suggested playlist based on one or more of listening trends and musical preferences of the group of users, the listening trends and musical preferences derived from both the metadata of the plurality of media and the metadata of the plurality of additional media.

7. A method for distributing media to a client electronic device, the method comprising:
   receiving from a client electronic device, at a media distribution system, a media request for electronic media;
   retrieving, by one or more processors of the system, first media from an electronic storage device of the system, according to the media request;
   streaming the first media from the system to the client electronic device for rendering;
   storing in the electronic storage device first metadata concerning the first media in a compilation of metadata;
   receiving second metadata from the client electronic device, the second metadata concerning second media stored locally on the client electronic device and rendered by the client electronic device;
   storing the second metadata in the compilation of metadata; and
   deriving one or more of listening trends and musical preferences from the compilation of metadata, including the first metadata and the second metadata;
   generating a suggested playlist based upon the one or more listening trends and musical preferences derived from the compilation of metadata, including the first metadata and the second metadata.

8. The method of claim 7, wherein the generated playlist comprises:
   a location of electronic media remote from the client electronic device and available to stream to the client electronic device from the system; and
   a location of electronic media locally stored on the client electronic device.

9. The method of claim 7, further comprising transmitting the suggested playlist to the client electronic device for storage of a client version of the suggested playlist on the client electronic device.

10. The method of claim 9, further comprising:
    storing a server version of the suggested playlist on the system; and
    synchronizing the client version of the suggested playlist stored on the client electronic device with the server version of the suggested playlist stored on the system.

11. The method of claim 10, wherein synchronizing the client version of the suggested playlist with the server version of the suggested playlist includes copying to the server version of the suggested playlist entries of the client version of the suggested playlist that are missing from the server version of the suggested playlist.

12. A non-transitory computer-readable storage medium having stored thereon instructions that, when executed by a computing device, cause the computing device to perform operations for distributing media to a client electronic device, the operations comprising:
   receiving a media request for electronic media from a client electronic device;
   retrieving, by one or more processors of the system, first media from an electronic storage device of the system according to the media request;
   streaming the first media to the client electronic device for rendering;
   storing in the electronic storage device first metadata concerning the first media in a compilation of metadata;
   receiving second metadata from the client electronic device, the second metadata concerning second media stored locally on the client electronic device and rendered by the client electronic device;
   storing the second metadata in the compilation of metadata; and
   deriving one or more of listening trends and musical preferences from the compilation of metadata, including the first metadata and the second metadata;
   generating a suggested playlist based upon the one or more listening trends and musical preferences derived from the compilation of metadata, including the first metadata and the second metadata.

13. The computer-readable storage medium of claim 12, wherein the generated playlist comprises:
   a location of electronic media remote from the client electronic device and available to stream to the client electronic device from the system; and a location of electronic media locally stored on the client electronic device.

14. The computer-readable storage medium of claim 12, the operations comprising transmitting the suggested playlist to the client electronic device for storage of a client version of the suggested playlist on the client electronic device.

15. The computer-readable storage medium of claim 14, the operations further comprising:
   storing a server version of the suggested playlist on the system; and
   synchronizing the client version of the suggested playlist stored on the client electronic device with the server version of the suggested playlist stored on the system.

16. The computer-readable storage medium of claim 15, wherein synchronizing the client version of the suggested playlist with the server version of the suggested playlist includes copying to the server version of the suggested playlist entries of the client version of the suggested playlist that are missing from the server version of the suggested playlist.

17. A client electronic device to render media, comprising:
   one or more processors;
   an electronic storage device accessible by the one or more processors, the electronic storage device storing one or more playlists and local electronic media, each of the one or more playlists including one or more locations of local electronic media and one or more locations of remote electronic media available to the client electronic device from a server device over a network;
   a network interface to interface with the network for the client electronic device to request and receive electronic media from the server device and transmit metadata to the server device;
   a client application to, by the one or more processors, render electronic media according to a playlist of the one or more playlists and to, by the network interface, transmit first metadata to the server device, the transmitted metadata indicating that a given local electronic media was rendered on the client electronic device to enable the server device to determine user preferences based upon the given local electronic media rendered on the client electronic device and to generate a playlist based upon the preferences determined.

18. The client device of claim 17, wherein the client application transmits metadata to the server device to enable the server device to generate suggested metadata for a playlist based upon the given local electronic media rendered.

19. The client device of claim 18, the client application further comprising a playlist compilation system to receive the suggested metadata from the server device and, by the one or more processors, compile a suggested playlist based upon the suggested metadata.

20. The client device of claim 18, the server device further comprising a playlist compilation system to use the suggested metadata and compile a suggested playlist based upon the suggested metadata, wherein the client application receives from the server device the suggested playlist generated by the server device.

* * * * *